US007959129B2

(12) United States Patent
Matsumoto

(10) Patent No.: US 7,959,129 B2
(45) Date of Patent: Jun. 14, 2011

(54) TWO-PORT SOLENOID VALVE

(75) Inventor: Takumi Matsumoto, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 553 days.

(21) Appl. No.: 12/129,899

(22) Filed: May 30, 2008

(65) Prior Publication Data
US 2008/0308761 A1 Dec. 18, 2008

(30) Foreign Application Priority Data

Jun. 18, 2007 (JP) .................................. 2007-159975

(51) Int. Cl.
*F16K 31/02* (2006.01)
(52) U.S. Cl. .............................. 251/129.19; 251/129.15
(58) Field of Classification Search ............. 251/129.15, 251/129.19
See application file for complete search history.

(56) References Cited

U.S. PATENT DOCUMENTS

| 5,544,857 A * | 8/1996 | Torrence ................... 251/129.15 |
| 5,810,330 A * | 9/1998 | Eith et al. ................. 251/129.19 |
| 2003/0102453 A1* | 6/2003 | Fukano et al. ............ 251/129.15 |

FOREIGN PATENT DOCUMENTS

JP     3-92687     4/1991

OTHER PUBLICATIONS

U.S. Appl. No. 12/128,357, filed May 28, 2008, Matsumoto, et al.

* cited by examiner

*Primary Examiner* — John K Fristoe, Jr.
*Assistant Examiner* — Marina Tietjen
(74) *Attorney, Agent, or Firm* — Oblon, Spivak, McClelland, Maier & Neustadt, L.L.P.

(57) ABSTRACT

A first cap is mounted at a movable iron core, a second cap holding a valve member is fitted to the first cap, capable of displacement, an biasing force F1 of an iron-core return spring biasing the movable iron core toward an initial position and an biasing force F2 of a buffer spring interposed between the movable iron core and the valve member are set so as to have a relation of F1>F2, and when the movable core is located at the initial position, gaps x, y are interposed between the valve member and a regulating portion of the second cap and between an engagement projection portion of the second cap and a front end wall of an engagement recess portion of the first cap, respectively.

7 Claims, 3 Drawing Sheets

TWO-PORT SOLENOID VALVE

TECHNICAL FIELD

The present invention relates to a two-port solenoid valve constituted so that a flow passage connecting two ports to each other is opened/closed by a poppet-type valve member and more particularly to a two-port solenoid valve of a type opening/closing and operating the valve member by a movable iron core of an electromagnetic operation portion in a direct-driven manner.

BACKGROUND ART

A two-port solenoid valve of a type in which a valve member for opening/closing a flow passage by approaching/separating from a valve seat in the flow passage connecting two ports is opened/closed and operated by a movable iron core of an electromagnetic operation portion in a direct-driven manner is publicly known as described in Japanese Unexamined Patent Application Publication No. 3-92687, for example.

This type of two-port solenoid valve usually has a fixed iron core and a movable iron core attracted to each other by a magnetic force generated by electricity flown through an excitation coil, a valve member held by the movable iron core, and an iron-core return spring for biasing the movable iron core toward an initial position away from the fixed iron core. And the two-port solenoid valve is configured such that when the excitation coil is not electrified, the movable iron core is separated from the fixed iron core by an biasing force of the iron-core return spring, the valve member held by the movable iron core is pressed onto the valve seat and the flow passage is closed, and when the excitation coil is electrified, the movable iron core is attracted to the fixed iron core so that the valve member is separated from the valve seat and the flow passage is opened.

Here, while the excitation coil is being electrified, the movable iron core is attracted to the fixed iron core so that the iron-core return spring is compressed. Thus, if electricity to the excitation coil is cut off from this state to be switched to a valve-closed state, the movable iron core is separated from the fixed iron core with great force by the biasing force of the iron-core return spring, the valve member collides with the valve seat with a large impact force by an inertia force of the movable iron core, and repetition thereof makes the valve member abraded easily.

Therefore, in the solenoid valve described in the above Patent Document, a buffer spring is interposed between the valve member and the movable iron core so that the impact force is absorbed by the buffer spring.

However, since in the above conventional solenoid valve, a cavity is formed on a front end face of the movable iron core in which the valve member is housed, the movable iron core should be formed in a special shape provided with a cavity of the size and shape according to the valve member, which makes configuration complicated and manufacturing troublesome. Also, when the valve seat should be provided at a position far from the movable iron core for design convenience, the length of the movable iron core can not be prolonged for that portion in many cases, which can not be easily coped with.

DISCLOSURE OF INVENTION

The present invention has an object to provide a two-port solenoid valve having a simple and rational design structure in which the conventional problems in the two-port solenoid valve are solved, a valve member can be installed without forming a cavity for containing the valve member in the movable iron core even with configuration that can prevent abrasion of the valve member, and a situation in which the valve seat should be provided at a position far from the movable iron core for design convenience can be easily coped with.

In order to achieve the above object, according to the present invention, a two-port solenoid valve is provided in which a fixed iron core and a movable iron core attracted to each other by a magnetic force generated by electricity to an excitation coil, a valve seat formed in a flow passage connecting the two ports, a valve member for opening/closing the flow passage by approaching/separating from the valve seat by an action of the movable iron core, and a hollow first cap and a hollow second cap fitted so as to be capable of mutual displacement for transmitting an acting force of the movable iron core to the valve member are concentrically disposed in a valve body along a valve axis.

The first cap is mounted at a front end portion of the movable iron core in a state for regulating forward movement with respect to the movable iron core and has an engagement recess portion that presses the movable iron core in a direction away from the fixed iron core by being biased by an iron-core return spring and is engaged with an engagement projection portion of the second cap. The second cap has the engagement projection portion at a location fitted to the first cap, and this engagement projection portion is engaged with the engagement recess portion capable of displacement and the valve member is housed in the second cap capable of displacement. At the front end portion of the second cap, a regulating portion for regulating forward movement of the valve member is formed and a buffer spring for biasing the valve member and the movable iron core in a direction separated from each other is interposed between the valve member and the movable iron core.

It is configured such that the biasing forces F1, F2 of the iron-core return spring and the buffer spring are set with a relation of F1>F2, and when the excitation coil is not electrified and when the movable iron core and the first cap is made to occupy an initial position by the iron-core return spring and the valve member is pressed onto the valve seat by the buffer spring, a gap is interposed between the valve member and the regulating portion of the second cap and between the engagement projecting portion of the second cap and a front end wall of the engagement recess portion in the first cap, respectively.

In the present invention, the first cap preferably has a spring seat for the iron-core return spring on its outer circumference, an iron-core fitting hole in which the movable iron core is fitted inside, an iron-core lock seat by means of which the movable iron core is locked, a cap fitting chamber to which a base end portion of the second cap is fitted, and the engagement recess portion formed in the cap fitting chamber, and the second cap is formed in a cylindrical shape and has the engagement projecting portion at its base end portion.

On the side wall of the cap fitting chamber and the side wall of the second cap, a projection and an engagement groove engaged with each other for performing a retaining function may be formed.

Also, in the present invention, the cap fitting chamber of the first cap forms an oval and the engagement recess portion and the engagement groove are formed on both side walls in the short-diameter direction of the oval in the cap fitting chamber, while a diameter of the second cap is formed smaller than a diameter in the short-diameter direction of the cap fitting chamber, and the engagement projection portion and the projection are formed on both side faces in the diameter direction of the second cap.

In the present invention, the valve body has an iron-core chamber in which the front end portion of the movable iron core and the first cap are housed and a valve chamber in a circular hole shape in which the valve seat is provided at a chamber bottom, concentrically continuing to the iron-core chamber, and by slidably fitting the cylindrical second cap into the valve chamber, it is possible to give a guide function for guiding displacement of the second cap to a chamber wall of the valve chamber.

In the solenoid valve of the present invention having the above constitution, an association is set so that the biasing forces F1, F2 of the iron-core return spring and the buffer spring is F1>F2, and it is so configured such that when the movable iron core is at the initial position (valve closing position), a gap is interposed between the valve member and the regulating portion of the second cap and between the engagement projection portion of the second cap and the engagement recess portion of the first cap, respectively, and if the valve opening state where the excitation coil is electrified is switched to the valve closing state by cutting off the electricity through the excitation coil, an acting force of the movable iron core pressed by the iron-core return spring is absorbed when the valve member is brought into contact with the valve seat and the buffer spring is compressed.

Therefore, the valve member does not collide with the valve seat with a great force by the inertia force of the movable iron core and abrasion of the valve member is prevented. Also, when the movable iron-core assembly is switched from the initial position to the operating position by electrifying the excitation coil, the buffer spring in the compressed state presses the movable iron core toward the fixed iron core side and acts so as to promote an attracting operation, and start of the movable iron core is not only rapid and easy but also excellent in response.

Moreover, since the valve member is held by the second cap, there is no need to form an engagement recess portion for containing the valve member at the movable iron core and even if the valve seat should be provided at a position far from the movable iron core for design convenience, that can be easily coped with only by adjusting the length of the second cap.

BEST MODE FOR CARRYING OUT THE INVENTION

Figure 1:
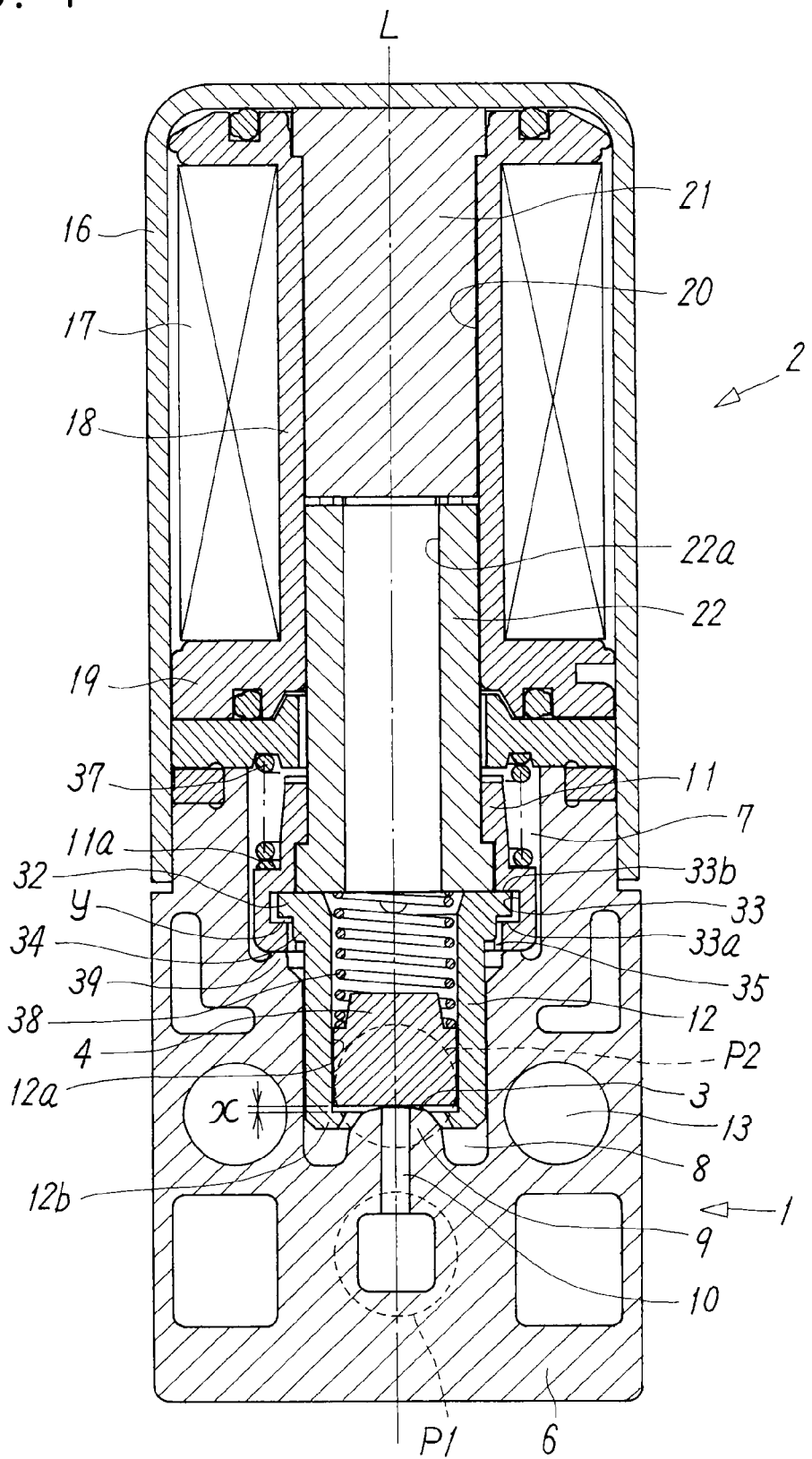
FIG. 1 is a sectional view illustrating an embodiment of a solenoid valve according to the present invention.

FIG. 1 shows an embodiment of a two-port solenoid valve according to the present invention. This solenoid valve comprises a main valve portion 1 provided with a poppet type valve member 4 for opening/closing a flow passage connecting two ports P1, P2 to each other and an electromagnetic operation portion 2 for opening/closing and operating the valve member 4, and the main valve portion 1 and the electromagnetic operation portion 2 are connected in series along a valve axis L, which is a center axis of the solenoid valve.

The main valve portion 1 has a valve body 6 made of a substantially square block. On one side face of the valve body 6, the two ports P1, P2 for input and output are formed. Also, inside the valve body 6, from the end face side to which the electromagnetic operation portion 2 is connected, an iron-core chamber 7 made of a circular hole or oval hole with a large diameter and a valve chamber 8 made of a circular hole with a small diameter concentrically continuing to the iron-core chamber 7 are formed, a semispherical projection portion 9 is formed at the center on a chamber bottom of the valve chamber 8, a communication hole 10 for input is opened at a top portion of the projection portion 9, and the valve chamber 8 communicates with the port P1 for input through the communication hole 10 for input and also communicates with the port P2 for output through a communication hole for output (not shown) opened at a wall portion on the chamber side close to the chamber bottom.

In the present invention, the "oval" refers to a shape that a circle is extended to right and left, in other words, end portions of two semicircles are connected to each other by parallel two sides and includes an ellipse and shapes similar to that.

At the top portion of the projection portion 9, the valve seat 3 in the annular state surrounding the opening of the communication hole 10 for input is formed concentrically with the valve axis L, and in the valve chamber 8, the poppet type valve member 4 approaching/separated from the valve seat 3 is disposed while held by a cylindrical second cap 12, capable of displacement. The valve member 4 is formed in a short columnar state from a material having elasticity and sealing property such as rubber, synthetic rubber and the like.

Reference numeral 13 in the figure is a screw insertion hole into which a screw for fixing the solenoid valve at an installation position is inserted.

The electromagnetic operation portion 2 has a rectangular tube shaped magnetic cover 16 formed by a magnetic material such as iron, and inside the magnetic cover 16, a hollow bobbin 18 made of a non-magnetic material around which an excitation coil 17 is wound, a magnetic plate 19 made of a magnetic material interposed between one end of the bobbin 18 and the valve body 6, an inner hole 20 extending across the bobbin 18 and the magnetic plate 19 at a position on the valve axis L, and a fixed iron core 21 and a movable iron core 22 made of a magnetic material disposed in the inner hole 20 and magnetically attracted to each other are provided. The magnetic plate 19 is magnetically bonded to the magnetic cover 16 by bringing its outer circumferential portion into contact with the inner face of the magnetic cover 16.

Figure 2:
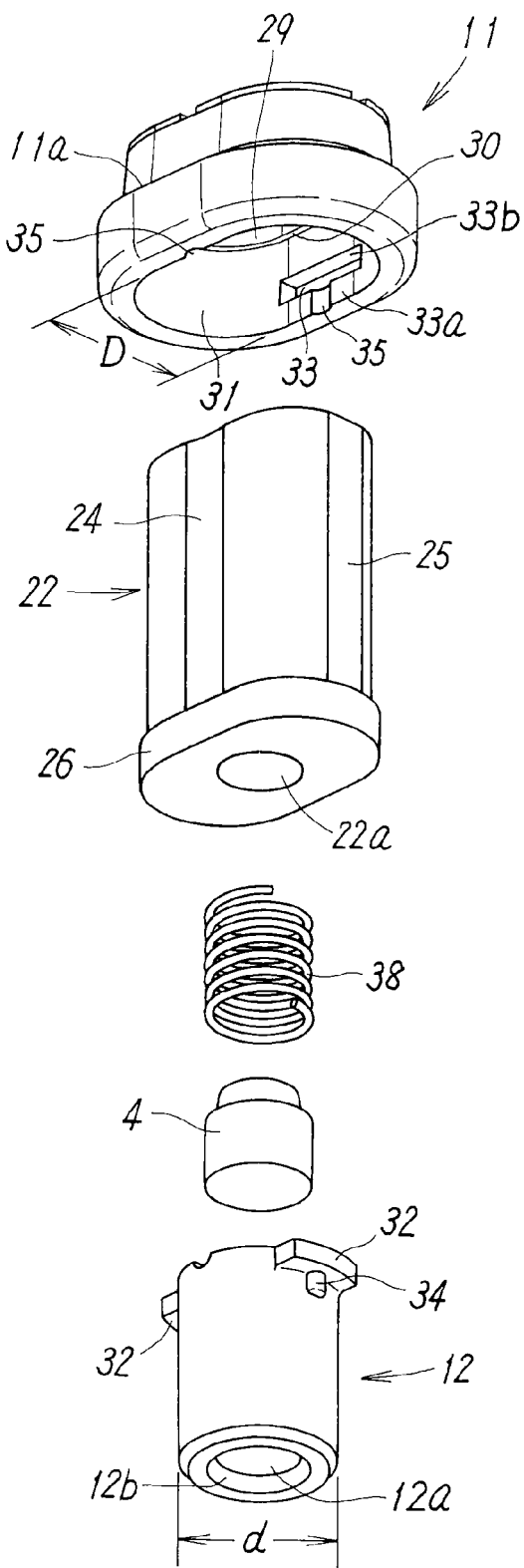
FIG. 2 is a perspective view illustrating parts relating to a movable iron core, first and second caps in an exploded manner.

The fixed iron core 21 and the movable iron core 22, as representatively shown for the movable iron core 22 in FIG. 2, have their sectional shape in oval, and on their side faces, a shallow and curved groove portion 24 is formed on both side faces in the short-diameter direction of the oval, while on both side faces in the long-diameter direction of the oval, a flat portion 25 having a flat surface is formed. On one end side in the axial direction of the both iron cores 21, 22, an oval flange portion 26 is formed. And the fixed iron core 21 and the movable iron core 22 are disposed in the oval inner hole 20 across the bobbin 18 and the magnetic plate 19 in a state where the end portions on the side where the flange portion 26 is not formed are opposed to each other.

The fixed iron core 21 is fixedly disposed in the inner hole 20 by fitting the flange portion 26 in a recess stepped portion 18a at the end portion of the bobbin 18 and sandwiching it between the bobbin 18 and an end wall portion 16a of the magnetic cover 16. The fixed iron core 21 is magnetically bonded to the magnetic cover 16 by bringing the flange portion 26 into contact with the end wall portion 16a.

On the other hand, the movable iron core 22 is in a hollow state provided with a center hole 22a and disposed in the inner hole 20 capable of movement along the valve axis L, and a front end portion having the flange portion 26 is extended into the iron-core chamber 7. To the front end portion of the movable iron core 22, a hollow first cap 11 and the hollow second cap 12 transmitting the acting force of the movable iron core 22 to the valve member 4 are connected concentrically.

The first cap 11 is a hollow member with the oval outer shape and has an oval iron-core fitting hole 29 with which the movable iron core 22 is fitted, an oval iron-core lock seat 30 by means of which the flange portion 26 of the movable iron core 22 is locked, and an oval cap fitting chamber 31 in which a base end portion of the second cap 12 is fitted capable of displacement are formed therein concentrically and sequentially from a rear end portion side toward the front end portion side.

At a position in the cap fitting chamber 31 opposite the hole wall in the short-diameter direction of the oval, an engagement recess portion 33 in which an engagement projection portion 32 formed on the second cap 12 is formed, and at a front end wall 33a, which is a wall on the front side along the valve axis L of the engagement recess portion 33, a semicircular engagement groove 35 is formed in which a positioning projection 34 formed on the second cap 12 is engaged.

Mounting of the first cap 11 onto the movable iron core 22 is, as shown in FIG. 2, carried out by fitting the first cap 11 from the rear end portion side of the movable iron core 22, but at this time, since the flange portion 26 of the movable iron core 22 is locked by the iron-core lock seat 30 from the front face side of the first cap 11, the first cap 11 is mounted in a state where forward movement with respect to the movable iron core 22 is regulated. However, rearward movement of the first cap 11 with respect to the movable iron core 22 is available.

However, the first cap 11 may be mounted in a state where the rearward movement with respect to the movable iron core 22 is also regulated, that is, in a fixed manner.

On the outer circumference of the intermediate portion of the first cap 11, a stepped-shaped spring seat 11a is formed, and an iron-core return spring 37 is interposed between the spring seat 11a and the magnetic plate 19, which is a member in a fixed relation with the valve body 6. The iron-core return spring 37 urges the movable iron core 22 in a direction away from the fixed iron core 21 through the first cap 11.

The second cap 12 is a cylindrical member and its outer diameter d is smaller than a diameter D in the short-diameter direction of the oval-shaped cap fitting chamber 31 in the first cap 11. Inside a hollow hole 12a of the second cap 12, the valve member 4 is housed so as to be capable of displacement along the valve axis L, and at the front end portion of the second cap 12, a regulating portion 12b in the inward flange shape regulating forward movement of the valve member 4 is formed, and a buffer spring 38 biasing the valve member 4 and the movable iron core 22 in a direction separated from each other is interposed between the valve member 4 and the movable iron core 22.

On both side faces in the diameter direction of the rear end portion in the second cap 12, the engagement projection portion 32 and the positioning projection 34 are formed. The engagement projection portion 32 is an arc-state projection portion extending in the circumferential direction of the second cap 12, while the positioning projection 34 is in a semi columnar state and extended in the axial direction at a position on the front side of the second cap 12 rather than the engagement projection portion 32.

The mounting of the second cap 12 onto the first cap 11 is carried out as follows. That is, the second cap 12 is set in an attitude having the engagement projection portion 32 and the positioning projection 34 oriented in the long-diameter direction of the cap fitting chamber 31 in the first cap 11 (See FIG. 2), and while the valve member 4 and the buffer spring 38 are housed in the hollow hole 12a, the base end portion of the second cap 12 is inserted into the cap fitting chamber 31. And by rotating the second cap 12 around the axis by 90 degrees so as to fit the engagement projection portion 32 in the engagement recess portion 33, and by engaging the positioning projection 34 in the engagement groove 35, the second cap 12 is connected to the first cap 11 in a partially fitted state while the buffer spring 38 is compressed between the valve member 4 and the movable iron core 22. At this time, the second cap 12 is capable of relative displacement in the valve axis L direction with respect to the first cap 11 in a range in which the engagement projection portion 32 can move in the front and rear direction within the engagement recess portion 33, in other words, between a position where the engagement projection portion 32 is brought into contact with the front end wall 33a of the engagement recess portion 33 and a position in contact with a rear end wall 33b.

The second cap 12 is slidably housed in the valve chamber 8 through a slight gap to an extent substantially in sliding contact with its chamber wall, by which the chamber wall of the valve chamber 8 plays a role of guiding displacement of the second cap 12. Therefore, the second cap 12 can stably displaced by the guiding function of the chamber wall without causing lateral displacement, twist or the like.

Here, the biasing forces F1, F2 of the iron-core return spring 37 and the buffer spring 38 are set in a relation of F1>F2, and when the excitation coil 17 is not electrified, the movable iron core 22 and the first cap 11 is made to occupy the initial position in FIG. 1 by the iron-core return spring 37 and when the valve member 4 is pressed onto the valve seat 3 by the buffer spring 38, it is so configured that gaps x and y are interposed between the valve member 4 and the regulating portion 12b of the second cap 12 and between the engagement projection portion 32 of the second cap 12 and the front end wall 33a of the engagement recess portion 33 in the first cap 11, respectively.

In the 2-port solenoid valve having the above configuration, when the excitation coil 17 is not electrified, as shown in FIG. 1, the movable iron core 22 is made to occupy the initial position away from the fixed iron core 21 by the biasing force of the iron-core return spring 37 acting through the first cap 11. At this time, the front end face of the first cap 11 is brought into contact with an annular stopper 39 formed on the chamber bottom wall of the iron-core chamber 7 surrounding the valve chamber 8. Also, since the second cap 12 is pressed by the first cap 11 and the movable iron core 22 and displaced to the valve seat 3 side, the valve member 4 in the second cap 12 is brought into contact with the valve seat 3 so as to close the communication hole 10 for input, and the buffer spring 38 between the valve seat 3 and the movable iron core 22 is compressed. And the gaps x, y are formed between the valve member 4 and the regulating portion 12b of the second cap 12 and between the engagement projection portion 32 of the second cap 12 and the front end wall 33a of the engagement recess portion 33 in the first cap 11, respectively.

Figure 3:
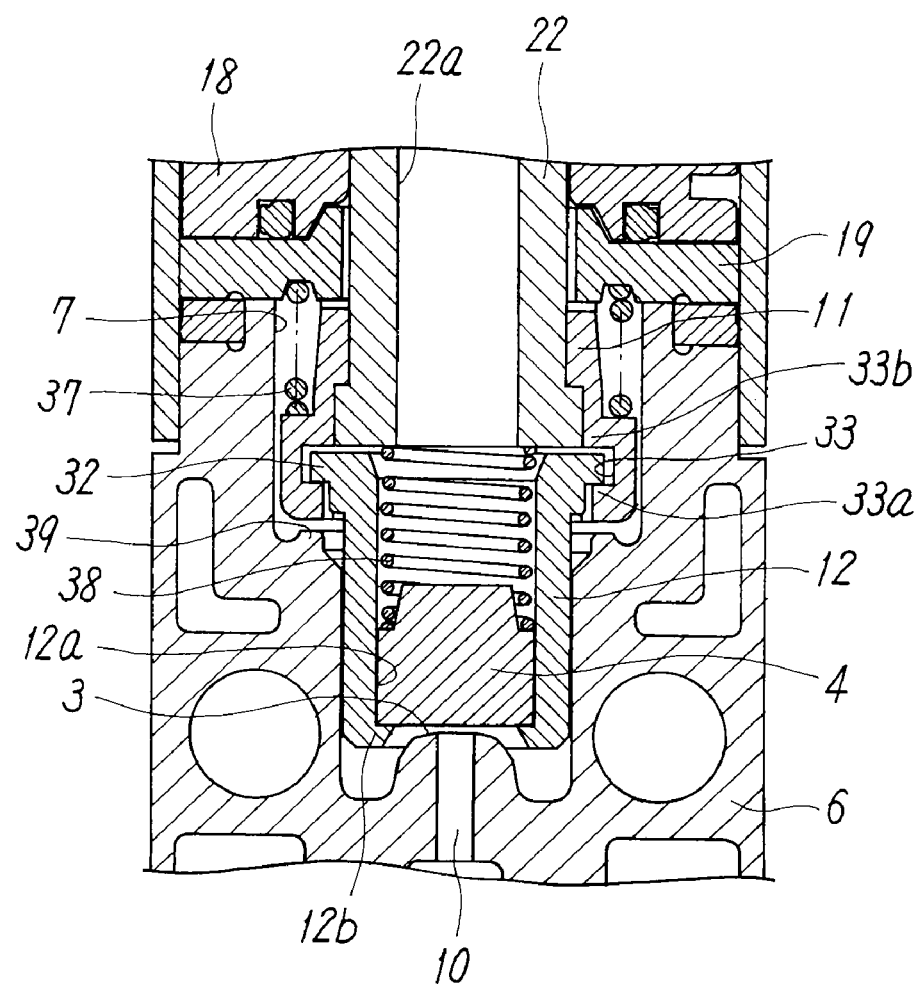
FIG. 3 is an enlarged view of an essential part in FIG. 1 illustrating a different operational state.

When the excitation coil 17 is electrified from this state, the movable iron core 22 is attracted to the fixed iron core 21 and as shown in FIG. 3, it is moved to an operating position (valve opening position) while compressing the iron-core return spring 37 through the first cap 11. At this time, in the middle of movement of the first cap 11, when the gap y between the front end wall 33a of the engagement recess portion 33 and the engagement projection portion 32 of the second cap 12 becomes zero, the first cap 11 is engaged with the second cap 12 so as to move the second cap 12 toward the operating position together. Subsequently, in the middle of the movement of the second cap 12, when the gap x between the regulating portion 12b and the valve member 4 becomes zero, the second cap 12 is engaged with the valve member 4 and moves the valve member 4 toward the operating position together. Thus, the valve member 4 is separated from the valve seat 3 and the communication hole 10 for input is opened.

In this state, a gap is formed between the front end face of the movable iron core 22 as well as the rear end wall 33b of the engagement recess portion 33 in the first cap 11 and the engagement projection portion 32 of the second cap 12.

When the excitation coil 17 is electrified and the movable iron core 22 starts an attracting operation, the buffer spring 38 in the compressed state presses the movable iron core 22 toward the fixed iron core 21 side so as to act to promote the attracting operation, and the start of the movable iron core 22 is expedited and facilitated by the action, which improves response.

When the excitation coil 17 is switched from the electrified state to the non-electrified state, the movable iron core 22 is switched to the above-mentioned initial position by the biasing force of the iron-core return spring 37, and by pressing the valve member 4 onto the valve seat 3 through the buffer spring 38, the communication hole 10 for input is closed. At this time, after the valve member 4 is brought into contact with the valve seat 3 and stopped at that position, the inertia force of the movable iron core 22 acting on the valve member 4 is absorbed by compression of the buffer spring 38. Thus, collision of the valve member 4 against the valve seat 3 with a great force by the action of the inertia force of the movable icon core 22 or being pressed strongly by a force more than necessary will not occur but abrasion of the valve member 4 is prevented and durability is improved.

Also, by having the valve member 4 held by the second cap 12 as mentioned above, there is no need to form a cavity for containing the valve member 4 in the movable iron core 22 as in a conventional product.

Moreover, if the valve seat 3 should be provided at a position separated from the movable iron core 22 for design convenience, that can be easily coped with by adjusting the length of the second cap 12, and inconvenience such as increase of weight or inertia force by prolonging the size of the movable iron core 22 can be avoided.

In the illustrated embodiment, the sectional shapes of the fixed iron core 21 and the movable iron core 22 are oval, but the sectional shapes may be circular. In this case, it is needless to say that the shapes of the members and portions relating to the fixed iron core 21 and the movable iron core 22 such as the inner hole 20 of the bobbin 18 and the magnetic plate 19, the first cap 11 and the iron-core fitting hole 29 formed therein, the iron-core lock seat 30 and the like are formed circular according to them.

The invention claimed is:

1. A two-port solenoid valve constructed by concentrically disposing, in a valve body along a valve axis, a fixed iron core and a movable iron core attracted to each other by a magnetic force generated by electricity to an excitation coil, a valve seat formed in a flow passage connecting two ports, a valve member for opening/closing the flow passage by approaching/separating from the valve seat by an action of the movable iron core, and a hollow first cap and a hollow second cap fitted so as to be capable of mutual displacement for transmitting an acting force of the movable iron core to the valve member, wherein the first cap is mounted at a front end portion of the movable iron core in a state for regulating forward movement with respect to the movable iron core and has an engagement recess portion that presses the movable iron core in a direction away from the fixed iron core by being biased by an iron-core return spring and is engaged with an engagement projection portion of the second cap;

the second cap has the engagement projection portion at a location fitted in the first cap, and this engagement projection portion is engaged with the engagement recess portion capable of displacement and the valve member is housed in the second cap, capable of displacement, a regulating portion for regulating forward movement of the valve member is formed at a front end portion of the second cap and a buffer spring for biasing the valve member and the movable iron core in a direction separated from each other is interposed between the valve member and the movable iron core;

biasing forces F1, F2 of the iron-core return spring and the buffer spring are set with a relation of F1>F2; and when the excitation coil is not electrified and when the movable iron core and the first cap is made to occupy an initial position by the iron-core return spring and the valve member is pressed onto the valve seat by the buffer spring, gaps are interposed between the valve member and the regulating portion of the second cap and between the engagement projection portion of the second cap and a front end wall of the engagement recess portion in the first cap, respectively.

2. The two-port solenoid valve according to claim 1, wherein the first cap has a spring seat for the iron-core return spring on its outer circumference, an iron-core fitting hole to which the movable iron core is fitted inside, an iron-core lock seat by means of which the movable iron core is locked, a cap fitting chamber to which a base end portion of the second cap is fitted, and the engagement recess portion formed in the cap fitting chamber, and the second cap is formed in a cylindrical shape and has the engagement projection portion at its base end portion.

3. The two-port solenoid valve according to claim 2, wherein on a side wall of the cap fitting chamber and a side face of the second cap, a projection and an engagement groove engaged with each other for performing a retaining function are formed.

4. The two-port solenoid valve according to claim 3, wherein the cap fitting chamber of the first cap forms an oval and the engagement recess portion and an engagement groove are formed on both side walls in the short-diameter direction of the oval in the cap fitting chamber, while a diameter of the second cap is formed smaller than a diameter in the short-diameter direction of the cap fitting chamber, and the engagement projection portion and a projection are formed on both side faces in the diameter direction of the second cap.

5. The two-port solenoid valve according to claim 2, wherein the cap fitting chamber of the first cap forms an oval and the engagement recess portion is formed on both side walls in the short-diameter direction of the oval in the cap fitting chamber, while a diameter of the second cap is formed smaller than a diameter in the short-diameter direction of the cap fitting chamber, and the engagement projection portion is formed on both side faces in the diameter direction of the second cap.

6. The two-port solenoid valve according to claim 2, wherein the valve body has an iron-core chamber in which the front end portion of the movable iron core and the first cap are housed and a valve chamber in a circular hole shape in which the valve seat is provided at a chamber bottom, concentrically continuing to the iron-core chamber, and by slidably fitting the cylindrical second cap into the valve chamber, a guide function for guiding displacement of the second cap is provided to a chamber wall of this valve chamber.

7. The two-port solenoid valve according to claim 1, wherein the valve body has an iron-core chamber in which the front end portion of the movable iron core and the first cap are housed and a valve chamber in a circular hole shape in which the valve seat is provided at a chamber bottom, concentrically continuing to the iron-core chamber, and by slidably fitting the cylindrical second cap into the valve chamber, a guide function for guiding displacement of the second cap is provided to a chamber wall of this valve chamber.

* * * * *